US007966266B2

(12) United States Patent
Delvat

(10) Patent No.: US 7,966,266 B2
(45) Date of Patent: Jun. 21, 2011

(54) METHODS AND SYSTEMS FOR COST ESTIMATION BASED ON TEMPLATES

(75) Inventor: Julien Delvat, Antibes Juan les Pins (FR)

(73) Assignee: SAP AG, Walldorf (DE)

( * ) Notice: Subject to any disclaimer, the term of this patent is extended or adjusted under 35 U.S.C. 154(b) by 587 days.

(21) Appl. No.: 11/515,246

(22) Filed: Sep. 5, 2006

(65) Prior Publication Data

US 2007/0271203 A1   Nov. 22, 2007

(30) Foreign Application Priority Data

May 5, 2006 (EP) .................................... 06290748

(51) Int. Cl.
*G06F 17/00* (2006.01)
*G06F 7/00* (2006.01)
(52) U.S. Cl. ............................ 705/400; 705/7; 707/705
(58) Field of Classification Search .................. 705/400, 705/7, 8, 30, 32, 1.1, 34; 707/607, 620–623, 707/705, 708, 713–718, 758, 769, 779; 717/113, 717/104, 106, 139, 108
See application file for complete search history.

(56) References Cited

U.S. PATENT DOCUMENTS

| | | | |
|---|---|---|---|
| 5,367,304 A | 11/1994 | Jan et al. | |
| 5,544,342 A | 8/1996 | Dean | |
| 5,835,899 A | 11/1998 | Rose et al. | |
| 6,272,672 B1 | 8/2001 | Conway | |
| 6,308,166 B1 | 10/2001 | Breuker et al. | |
| 6,996,556 B2 * | 2/2006 | Boger et al. ...................... | 707/3 |
| 2005/0091252 A1 | 4/2005 | Liebich et al. | |
| 2005/0120032 A1 | 6/2005 | Liebich et al. | |
| 2007/0231781 A1 * | 10/2007 | Zimmermann et al. ....... | 434/350 |
| 2007/0276755 A1 | 11/2007 | Rapp | |
| 2008/0147457 A1 | 6/2008 | Rapp | |
| 2009/0276771 A1 * | 11/2009 | Nickolov et al. ............. | 717/177 |

OTHER PUBLICATIONS

Foley, Mary Jo, "Objects for Business Apps. Are Coming," Datamation, May 15, 1996; ABI/Inform. Global, p. 52.
Spanyi, Andrew, "Strategic Achievement," Datamation, Industrial Engineer, Mar. 2003, ABI/Inform. Global, p. 40-43.
Hefeeda, Mohamed Mosaad Salah, Ph.D., "A Framework for cost-effective peer-to-peer content distribution," Purdue University, 2004.

* cited by examiner

*Primary Examiner* — Igor Borissov
(74) *Attorney, Agent, or Firm* — Finnegan, Henderson, Farabow, Garrett & Dunner LLP

(57) ABSTRACT

Systems and methods are disclosed for generating cost estimates. In one implementation, a cost estimation system includes cost object metadata describing a mapping between functions at a cost estimation system and corresponding functions at a cost evaluation system. Based on the metadata, the cost estimation system determines whether a cost object requires evaluation in the cost evaluation system and, based on that determination, provides an evaluation request for the cost object to the cost evaluation system. In response to the evaluation request, the cost estimation system receives cost data determined by the cost evaluation system and calculates the cost estimate.

17 Claims, 10 Drawing Sheets

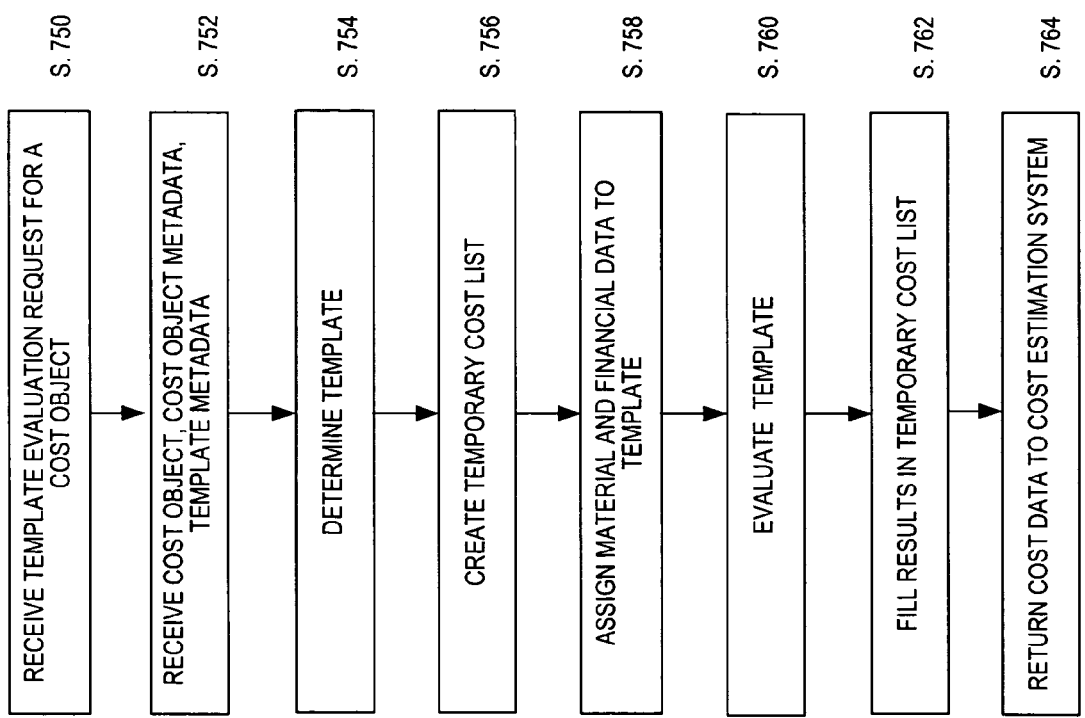

METHODS AND SYSTEMS FOR COST ESTIMATION BASED ON TEMPLATES

TECHNICAL FIELD

The present invention generally relates to the field of data processing and to systems and methods for calculating costs. More particularly, the invention relates to systems and methods that allow a user to model and evaluate cost objects associated with, for example, running a business or providing a product or service.

BACKGROUND INFORMATION

In the business world, the ability to accurately predict costs is critical to providing products and services to customers. To determine the costs associated with its operations, a business may rely upon modeling software. In doing so, the business may estimate the total costs it will incur throughout the various phases of, for example, design, development, production and/or performance of the product or service. In addition, by modeling expected costs, the business may compare alternative scenarios for new products or services. For instance, by varying the choice of components included in a model, a business can determine the cost savings achieved by substituting one component or activity for another.

Enterprise resource planning (ERP) systems include powerful software tools for modeling costs associated with a business's products and services. A particular business may develop cost templates for its ERP system that model different activities performed by the business and include cost functions for providing these products and services. To ensure accuracy, the business may invest great time and expense in developing these templates for their operations. With the cost templates and data stored in the ERP system, the ERP system may estimate costs associated with products or services. In addition, the business may determine whether a particular process is conforming to a prior estimate.

Because ERP systems generally maintain updated, business-wide information of a business's costs, estimates produced by evaluating cost templates in an ERP system can be particularly accurate. Furthermore, since the ERP system may model indirect costs associated with overhead activities in addition to direct costs associated with a product or service (e.g., direct labor and material), the cost estimate may accurately represent the total cost for a product or service.

In light of the advantages of using an ERP system and templates for cost estimation, a business may wish to access its ERP system and templates for estimating the cost of new products while, at the same time, not disrupting the business's ongoing operations. For instance, when creating cost estimates for new products, a business may prefer not to change the templates, cost objects or data within the ERP system that the business relies on to manage its manufacturing processes. Accordingly, it would be advantageous to access and use the templates from an environment outside of the ERP system to create cost estimates and/or price quotes for new products including elements that are not modeled or do not yet exist within the ERP system.

Accordingly, there is a need for systems and methods that address one or more of the above-noted needs. Moreover, there is a need for improved systems and methods for calculating cost estimates in an external cost estimation system using cost templates of a cost evaluation system, such as an ERP system. In addition, there is also a need for systems and methods that estimate the cost of products or services including items not already modeled or included in an ERP system.

SUMMARY OF THE INVENTION

Consistent with embodiments of the present invention, systems and methods are disclosed for estimating costs. Moreover, embodiments of the invention relate to systems and methods that allow a user to model and evaluate cost objects associated with, for example, running a business or providing a product or service. As disclosed herein, such embodiments may be computerized or software enabled. Embodiments also relate to systems and methods for estimating costs with a cost estimation system or environment that is external or separate from a cost evaluation system, such as an costing platform.

Systems and methods are disclosed for producing a cost estimates. In one embodiment a cost estimation system selects a cost object included in a cost estimate, wherein the cost object requires evaluation of a function to be performed by the cost estimation system to determine the cost of the object. Based on cost object metadata describing a mapping between the function of the cost estimation system and another function of a cost evaluation system, the cost estimation system determines whether the cost object requires evaluation using the function of the cost evaluation system. Based on the determination, the cost estimation system provides the cost object to the cost evaluation system as part of an evaluation request. In response, the cost estimation system receives cost data for the cost object from the cost evaluation system and, using the cost data, calculates a cost estimate for the cost object.

In another embodiment, a cost evaluation system receives an evaluation request to evaluate a cost object from a cost estimation system, wherein the evaluation request includes template metadata indicating a template for evaluating the cost object with the cost evaluation system. In response to the evaluation request, the cost evaluation system retrieves the template indicated by the template metadata and provides cost data for the cost object to the cost estimation system, wherein a cost estimate for the cost object may be calculated by the cost estimation system using the cost data.

Both the foregoing general descriptions and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and subcombinations of the features described in the detailed description.

BRIEF DESCRIPTION OF THE DRAWINGS

The accompanying drawings, which are incorporated in and constitute a part of this disclosure, illustrate exemplary embodiments and various aspects of the present invention. In the drawings:

FIG. 7 illustrates a block diagram of another exemplary process, consistent with an embodiment of the present invention.

DETAILED DESCRIPTION

The following detailed description of embodiments of the present invention refers to the accompanying drawings. Where appropriate, the same reference numbers in different drawings refer to the same or similar elements.

Figure 1:
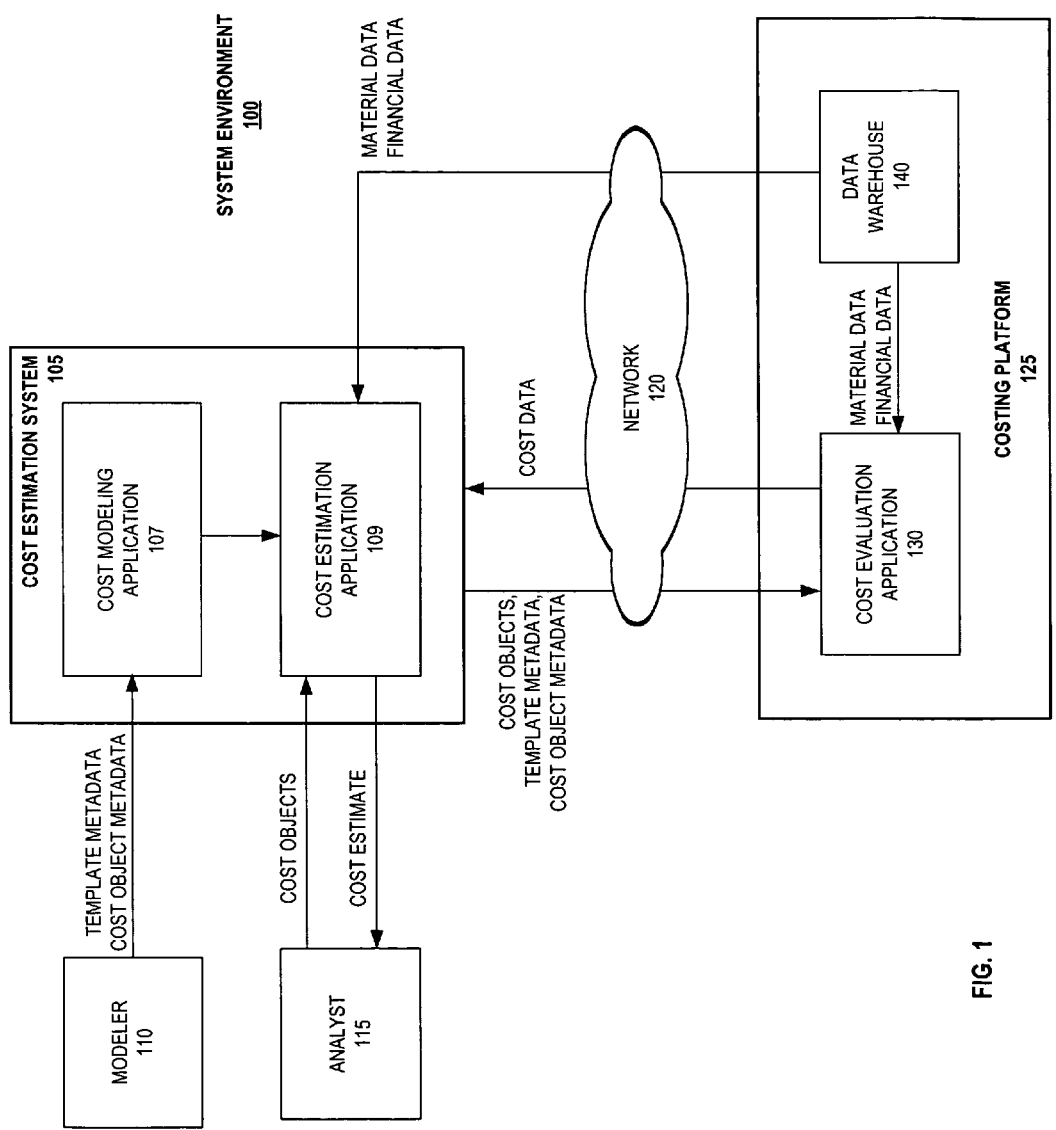
FIG. 1 is a diagram of exemplary system environment, consistent with an embodiment of the present invention.

Embodiments of the present invention enable cost estimates to be calculated in a cost estimation system using one or more templates provided by a cost evaluation system, such as an costing platform or application. As disclosed herein, the cost estimation system may be external or separate from the cost evaluation or costing platform. FIG. 1 provides an example of such an arrangement.

Consistent with the present invention, a cost template may be implemented as a cost allocation tool that includes functions for dynamically calculating quantities (e.g., numerical or Boolean) for cost objects based on associated activities or business processes. Cost objects within a template may represent components, items, activities and/or processes involved in producing a product or providing a service. Each template may include and/or reference one or more functions that, together, determine quantities of cost objects and associated activities. The template functions may be algorithms defined by the user or provided by a costing platform. In determining a quantity, the template functions may retrieve information from fields within template elements or by using algorithms outside the templates. Once quantities for a cost object are determined with the template, the template may calculate the total cost associated with each cost object.

By way of example, to provide a cost estimate for a product such as a water pump, a business might require an electric motor. In a cost estimation system, an object type may be defined that contains cost objects constituting different motors. Motors included within that type might include various characteristics (e.g, such as lot size, weight, material, supplier, etc.) or key figures (e.g., cost per unit). By selecting motors having different characteristics for inclusion in a cost estimate, the business can evaluate the differences in costs in the planning phase that result from using different motors. For instance, changing the weight or lot size may alter the overhead costs associated with handling and/or transporting the motor during production of the water pump. The same principle can be applied to other object types.

FIG. 1 is a block diagram of an exemplary system environment 100, consistent with an embodiment of the present invention. As shown, system environment 100 includes a modeler 110, an analyst 115, a cost estimation system 105, a network 120 and a cost evaluation system in the form costing platform 125.

Modeler 110 may comprise a human user of the cost estimation system 105 that operates a software application for creating models of cost objects for generating price estimates for new or modified products or services. For example, using a cost modeling application hosted by cost estimation system 105 or running on a personal computer (PC) or terminal (not shown), modeler 110 may model a new cost object describing activities or materials used in a new product or service. Each model of a cost object may be defined using metadata representing a variety of characteristics or functions of a cost object which are used in evaluating a cost template in costing platform 125. For example, to perform an analysis for overhead management, template metadata may be defined including: context (e.g., currency/location/controlling area); posting level (e.g., fiscal year/period); and model version (e.g., costing version). In addition, cost object metadata may be defined describing functions used in calculating a cost template. For example, cost object metadata might describe key figures which define cost parameters, such as costs/quantities, revenue/profit, etc. The cost modeling application may be implemented with software, including commercially available software such as the WINCHEM modeling application available from Selerant Corporation.

Analyst 115 may be a human user of the cost estimation system 105 that operates a software application for analyzing the costs of products or services based on cost estimates produced by cost estimation system 105. For instance, analyst 115 may, through an input made to cost estimation system 105, create a cost estimate including cost objects of a product or service. Based on analyst 115 request, cost estimation system 105 may calculate the cost estimate, including requesting evaluation of cost objects by the costing platform 125 to determine associated cost data, such as overhead activity cost. Based on the results of an evaluation request, cost estimation system 105 may calculate a cost estimate using cost objects and associated cost data.

Cost estimation system 105 may comprise a data processing system executing one or more software applications for generating cost estimates. As disclosed herein, the cost estimates may be generated using one or more templates, such as templates from costing platform 125. In accordance with one embodiment, cost estimation system 105 comprises one or more computer systems including, for example, a personal computer, minicomputer, microprocessor, workstation, mainframe or any other conventional computing platform. Furthermore, cost estimation system 105 may include additional components, peripherals and/or user interface devices typical of such computing platforms.

Through cost estimation system 105, modeler 110 or analyst 115 may access or import cost templates, functions and/or other cost parameters from costing platform 125 for modeling costs of a product or system. Furthermore, cost estimation system 105 may, in response to a command by an analyst 115 or other user to calculate a cost estimate and provide evaluation requests to costing platform 125 for evaluation by cost evaluation application 130. Each template evaluation request may include cost objects, template metadata, and cost object metadata based on input from modeler 110 and/or analyst 115. By exporting cost objects for evaluation to cost evaluation application 130, cost estimation system 110 system may estimate costs associated with the cost objects based on cost data generated within the costing platform 125. For instance, based on a cost object describing a material, cost evaluation application 130 may provide cost data for an estimated overhead cost object representing the cost of purchasing, transporting and disposing of the material.

Network 120 may facilitate communication between the components in system environment 100, including the components of cost estimation system 105 and costing platform 125. Network 120 may be any shared, public, private, or peer-to-peer network, encompassing any wide or local area network, such as an extranet, an intranet, the Internet, a Local Area Network (LAN), a Wide Area Network (WAN), a public switched telephone network (PSTN), an Integrated Services Digital Network (ISDN), radio links, a cable television network, a satellite television network, a terrestrial wireless network, or any other form of wired or wireless communication networks. Further, network 120 may be compatible with any type of communications protocol used by the components of system environment 100 to exchange data, such as the Ethernet protocol, ATM protocol, Transmission Control/Internet Protocol (TCP/IP), Hypertext Transfer Protocol (HTTP), Hypertext Transfer Protocol Secure (HTTPS), Real-time Transport Protocol (RTP), Real Time Streaming Protocol (RTSP), Global System for Mobile Communication (GSM) and Code Division Multiple Access (CDMA) wireless formats, Wireless Application Protocol (WAP), high bandwidth wireless protocols (e.g., EV-DO, WCDMA), or peer-to-peer protocols. The particular composition and protocol of network 120 is not critical as long as it allows for communication between cost estimation system 105 and costing platform 125.

Costing platform 125 may be implemented as one or more computer systems including, for example, a personal computer, minicomputer, microprocessor, workstation, mainframe or similar computing platform typically employed in the art. Additionally, costing platform 125 may have components typical of such computing systems including, for example, a processor, memory, and data storage devices. Further, costing platform 125 may execute a suite of integrated software applications supporting the management of various departments within a business, such as manufacturing, order processing, billing, accounting, materials tracking and human resources management. By way of example, costing platforms 125 may be one of an integrated suite of software applications within SAP R/3 or mySAP, commercially available from SAP AG (Walldorf, Germany) which provides information systems for manufacturing, distribution, order processing, accounting and human resources.

In accordance with the exemplary embodiment of FIG. 1, costing platform 125 may include a cost evaluation application 130 and data warehouse 140. Cost evaluation application 130 may be a software application executable by a processor to provide methods and features consistent with embodiments of the present invention. As shown in FIG. 1, cost evaluation application 130 may be provided as a module or component in costing platform 125. However, in other instances, cost evaluation application 130 may be provided as a stand-alone software application (e.g., a computer program product). Consistent with embodiments of this invention, cost evaluation application 130 may receive cost objects, template metadata, and cost object metadata 234 from cost estimation system 105 and return, in response, cost data for inclusion in, for example, a cost estimate. In addition, cost evaluation application 130 may access material data, financial data, and other business data stored in data warehouse 140.

Data warehouse 140 may be implemented with a variety of components or subsystems including, for example, a magnetic disk drive, an optical disk drive, flash memory, or other devices capable of storing information. Data warehouse 140 may serve as a central repository for data collected from various business management software applications included in the costing platform 125. For instance, a material management system may store material cost data in data warehouse 140. In addition, a financial accounting system may store key figures representing technical, commercial or performance (e.g., price per unit, production per worker, pallets per hour, etc.) in data warehouse 140. By referencing the data in data warehouse 140, cost estimation system 105 may calculate cost estimates. Although FIG. 1 illustrates data warehouse 140 as being part of costing platform 125, data warehouse 140 may optionally be an independent component within system environment 100. Further, by way of example, data warehouse 140 may be implemented with commercially available software, such as SAP Business Information Warehouse (SAP BW) available form SAP AG.

The embodiment illustrated in FIG. 1 is exemplary. Modifications to the system environment 100 can be made, including the addition, substitution or combining of components. As is readily apparent to one of ordinary skill in the art, system environment 100 is not limited to a single cost estimation system 105 communicating over a single network 120 with a single cost evaluation application 130. Practical embodiments may include a plurality of terminals, computers, and/or servers linked over multiple networks by a plurality of network exchange points sharing data between the networks.

Figure 2:
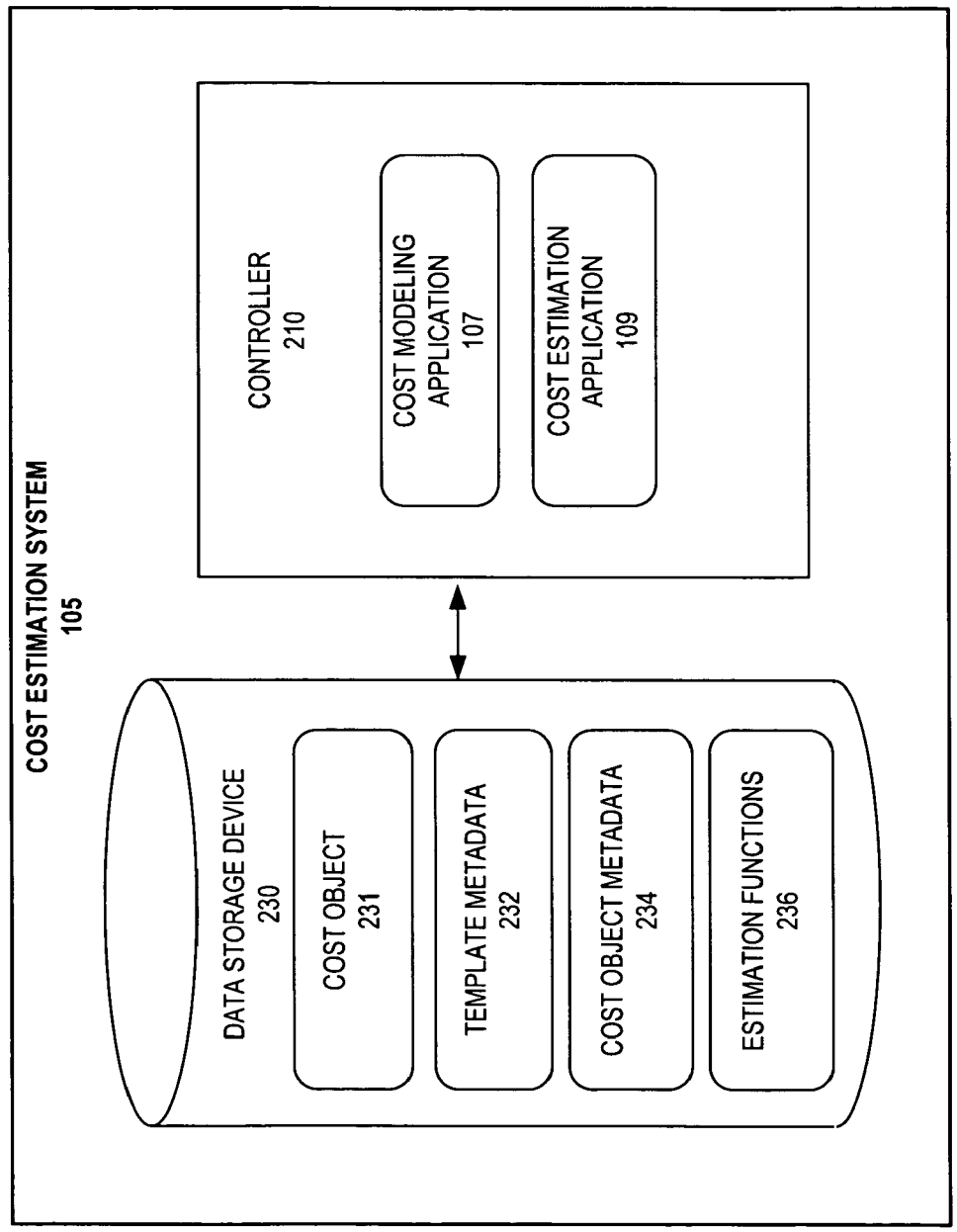
FIG. 2 is a diagram of an exemplary cost estimation system, consistent with an embodiment of the present invention.

FIG. 2 is a block diagram of an exemplary cost estimation system 105, consistent with an embodiment of the invention. Cost estimation system 105, as shown in FIG. 2, includes a controller 210 and a data storage device 230. Controller 210 may be one or more processing devices that execute computer instructions stored in one or more memory devices to provide functions consistent with certain aspects of the embodiments described herein. Controller 210 may include, for example, a CPU, memory, network interface, video interface, audio interface, and communications interface (not shown). In addition, controller 210 may include other components, peripherals devices and user interface devices typical of such computer system. As discussed in greater detail below, consistent with embodiments of the present invention, controller 210 may execute cost estimation application 109.

Data storage device 230 may store computer-readable instructions and data for cost estimation system 105 and cost estimation application 109. Data storage device 230 may be implemented with a variety of components or subsystems including, for example, a magnetic disk drive, an optical disk drive, flash memory, or other devices capable of storing information. As shown in FIG. 2, data storage device 230 may store data and instructions for processing by controller 210, including cost objects 231, template metadata 232, and cost object metadata 234, and estimation functions 236.

Cost objects 231 may be models of any set of business-related activities, or any other valuated entity such as resources, personnel, products, parts or raw materials. Cost object 231 may include characteristics, functions and/or other parameters describing the activity or component modeled by the cost object 231.

Template metadata 232 may be data that describes parameters of a template necessary for the processing of the template by cost evaluation application 130. In order to evaluate a cost estimate in cost evaluation application 130, a cost template may require certain parameters defining the context and relationships of a cost object regard to the business. For example, template metadata may include data describing the business group or cost center responsible for the activity associated with a cost object, as well as the corresponding overhead rate of the group. Based on the metadata, cost evaluation application may determine the proper template to evaluate to the cost estimate, as well as the values, such as overhead rates, or other parameters to employ in the calculation.

Estimation functions 236 may be formula or algorithms for calculating values in a cost object 231, such as characteristics and key figures. For example, estimation functions 236 may represent a costing formula, such as a relationship between the price and quantity of a product. Estimation functions 236 may be algorithms defined by the modeler 110 or provided by a costing evaluation system 105. When modeling a cost object, a modeler 110 may define a functions 236 for attributes of the object that will be calculated when the cost object 231 is evaluated.

Cost object metadata 234 may be data describing relationships between estimation functions 236 or associated with an element of a cost estimate created in a cost estimation system 105 and corresponding template functions 312 associated with templates in the cost evaluation application 125. For example, a function may represent a costing formula, such as a equation for calculating a price based on a quantity of an activity or material. Because modeler 110 and other users may freely define functions associated with cost objects created in cost estimation system 105, the cost evaluation application 130 cannot know in advance the correspondence between functions used in each application. Accordingly, cost object metadata 234 may be defined, as described in more detail below with regard to FIGS. 4A and 4B, and provided to cost evaluation application 130 for evaluation of cost estimate including new cost objects with a cost template. For instance, modeler 110 or other user, using a graphical user interface provided by cost estimation system 105, may define associations between cost objects created in cost modeling application 105 and corresponding functions provided in the costing platform 125.

In addition to the data described above, data storage device 230 may store other computer instructions, such as program code for Internet communications, operating system, kernel, device drivers, and configuration information, such as a Dynamic Host Configuration Protocol configuration, a web browser, and/or any other software that may be installed in cost estimation system 105.

As illustrated in FIG. 2, controller 210 may execute cost modeling application 107 and cost estimation application 109. Cost modeling application 107 may be a software program executed by controller 210 for creating and/or configuring cost objects, in accordance with embodiments of the present invention. Generally, for an cost template to generate a result, certain information must be imported into the cost estimation system 105. As such, cost modeling application 107 may allow a user, such as a modeler 110, to create or customize a cost object, assign template metadata, and define cost object metadata 234. For this process, modeling application 107 may provide one or more graphical user interfaces to receive input from and provide output to a modeler 110.

Cost estimation application 109 may be a computer program executed by controller 210 for generating cost estimates based on ERP templates, in accordance with embodiments of the present invention. Cost estimation application 109 may provide one or more user interfaces, such as a graphical user interface to receive input from and provide output to a user. Specifically, graphical user interface may include conventional screen elements, such as menus, lists, tables, icons, action buttons, and selection or text entry fields, for this purpose. Through the user interface, a user such as analyst 115 may control cost estimation application 109. For instance, an analyst 115 may control cost estimate application 109 to create a cost estimate based on cost objects 231 available within cost estimation system 105. Cost estimation application 109 may allow analyst 115 to select cost objects 231 for inclusion in a cost estimate based on types, characteristics, and/or values associated with the cost object 231.

Consistent with embodiments of the invention, other configuration components or tools may be provided to assist modeler 110 in configuring cost objects for evaluation. For example, a function builder (not shown) may be provided to assist a modeler 110 in creating and building estimation functions 236 that define functional relationships or dependencies between element. Additionally, a library manager (not shown) may be provided to store and/or facilitate access to predefined functions. Such formulas or functions may be grouped by topic (e.g., financial accounting equations to analyze key figures) and selected by modeler 110 or other user.

The configuration and relationship of software components illustrated in FIG. 2 is exemplary. One of ordinary skill in the art may select different component configurations or relationships based on the particular requirements and implementation of cost estimation system 105. Furthermore, software modules 107 and 109 may be implemented as independent modules that are operatively connected, or they may be combined within a single software program including the functions of some or all of the modules.

Figure 3A:
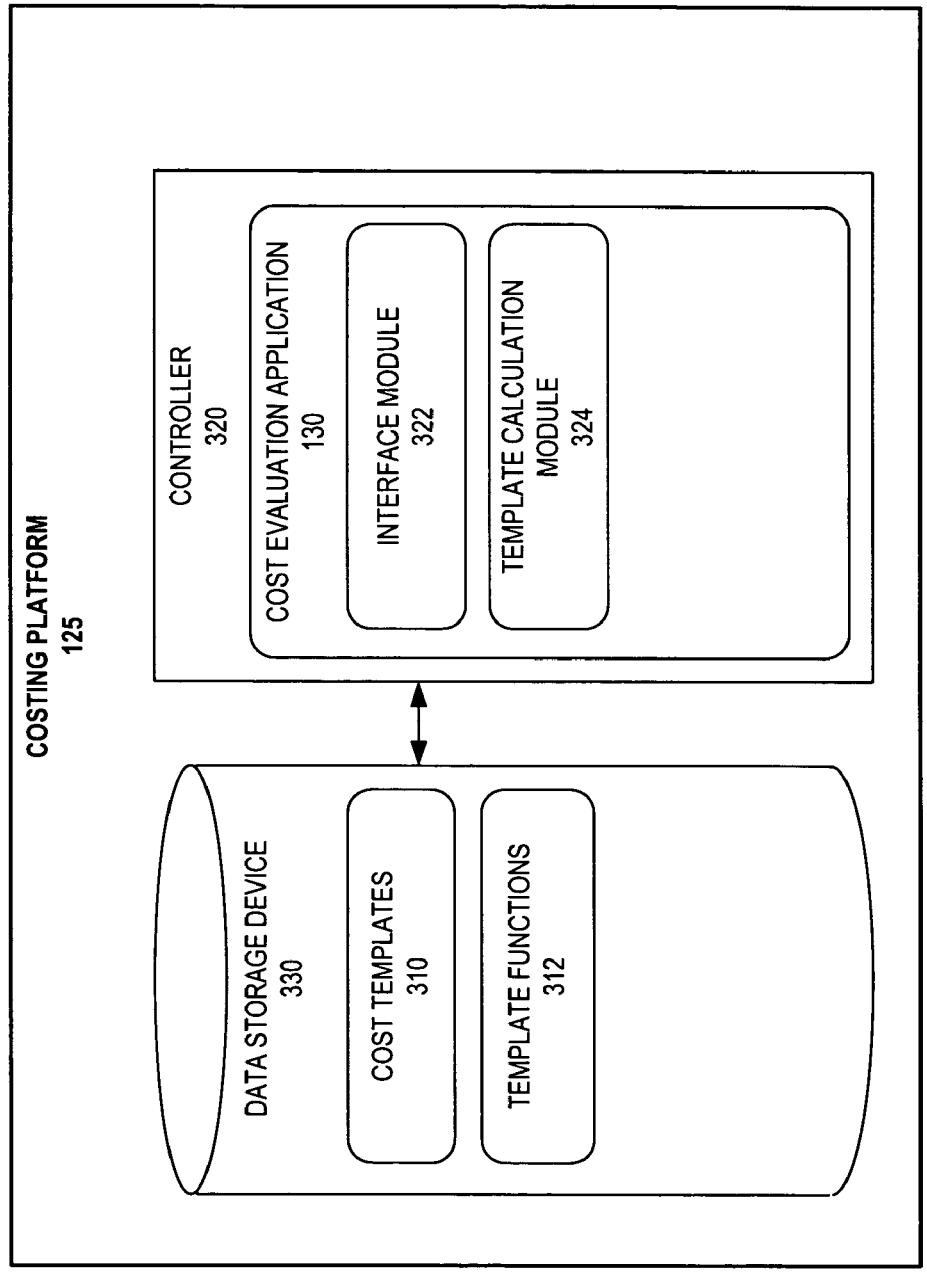
FIGS. 3A and 3B are diagrams related to an exemplary enterprise resource planning system, consistent with embodiments of the present invention.
Figure 3B:
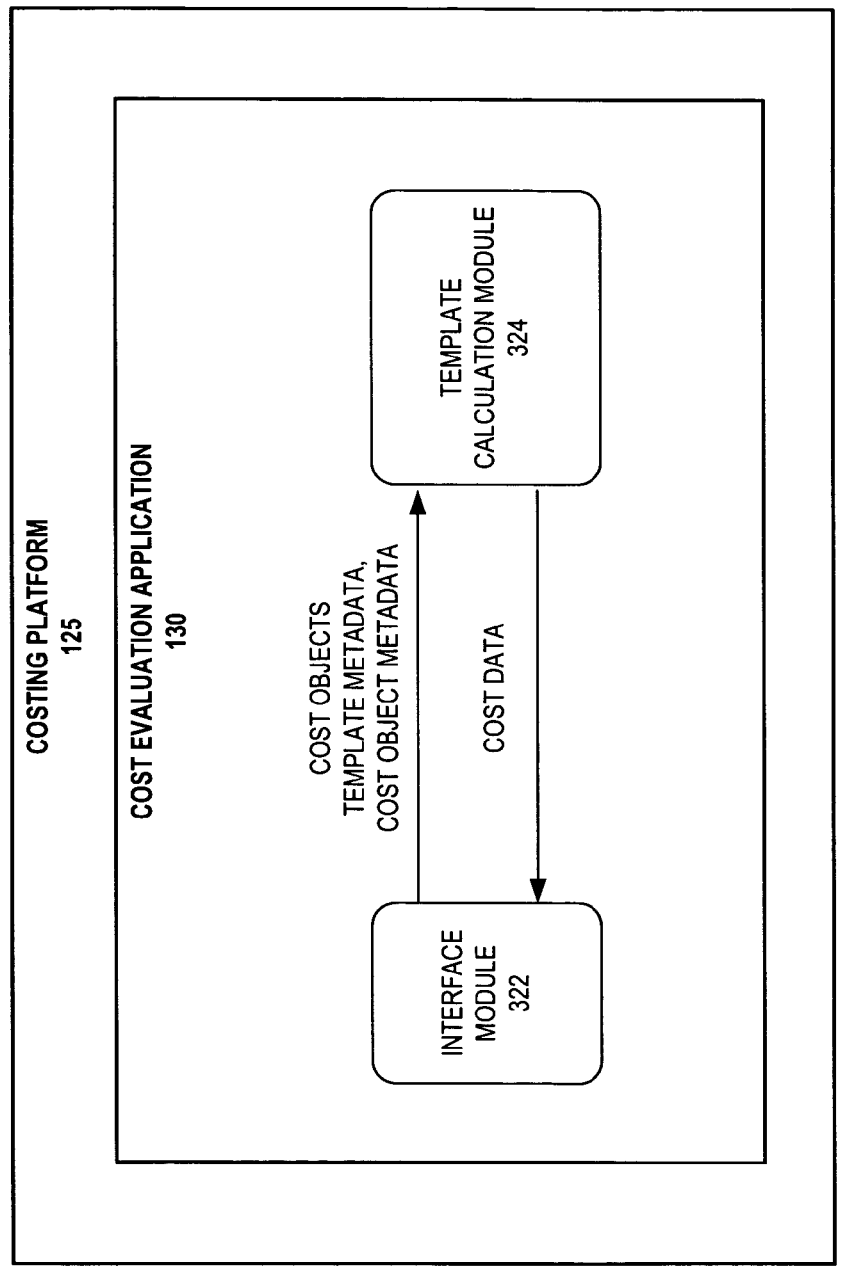

FIGS. 3A and 3B illustrate block diagrams for an exemplary costing platform 125, consistent with embodiments of the present invention. As shown in FIG. 3A, costing platform 125 includes a controller 320 and a data storage device 330. Controller 320 may comprise one or more processing devices that execute computer instructions stored in one or more memory devices to execute functions and application software including cost evaluation application 130. Cost evaluation application 130 may be implemented as a software application executed by controller 320 for evaluating costs and measuring performance associated with a set of cost objects, such as activities that occur in the process of designing and producing a product or service, or any other business-related activities. As shown in FIG. 3A, cost evaluation application 130 may further include interface module 322 and template calculation module 324.

Interface module 322 may comprise a software program executed by controller 320 to exchange data between cost estimation system 105 and cost evaluation application 130. Interface module 322 may be, for example, an application program interface (e.g., API or BAPI) that manages requests for template evaluation services from cost estimation system 105 to the cost evaluation application 130. Interface module 322 may, for example, extract data included in a function call generated by cost estimation system 105, and reorganize the data into a format required by the cost evaluation application 130. Furthermore, interface module 322 may temporally store data provided by cost estimation system 105 while awaiting evaluation services from cost evaluation application 130 and/or provide the data to cost evaluation application 130 upon request.

For instance, cost estimation application 109 may call functions at the interface module 322, causing the interface module 322 to retrieve from cost evaluation application 130 various information including lists of templates and functions available in costing platform 125. In addition, through function calls to the interface module 322, cost estimation system 105 may request evaluation of a cost object at cost evaluation application 130 for calculation by template calculation module 324. Alternatively, rather than using an application program interface, the above functionality may be achieved by remote function calls directly between cost estimation system 105 and costing platform 125.

Template calculation module 324 may be a software application executed by controller 320 for evaluating cost estimates submitted from cost estimation system 105. Templates 310 may be used to evaluate various cost objects including, for example, activities or processes related to producing a business product or service. As such, template calculation module 324 may receive, for example, cost templates, cost objects 231, template metadata 232, and cost object metadata 234 from interface module 322 provided to costing platform 125 by cost estimation system 105 in response to an analysts 115 request to calculate a cost estimate. After evaluating a template, template calculation module 324 may return a result, including cost data representing, for example, overhead and other indirect costs, to interface module 322 for provision to cost estimation system 105.

Data storage device 330 may store computer-readable instructions and data for costing platform 125, including cost evaluation application 130. Data storage device 330 may be implemented with a variety of components or subsystems including, for example, a magnetic disk drive, an optical disk drive, flash memory, or other devices capable of storing information. As shown in FIG. 3, data storage device 330 may store data and instructions for processing by controller 320 and including templates 310 and template functions 312.

Templates 310 may be cost allocation tools, such as a table, including functions for calculating quantities for cost objects 231 based on associated activities or business processes. Templates 310 may reference one or more template functions 312 either provided within a template or stored in, for example, data storage device 330. Based on template functions 312 and other cost parameters, such as material and financial data retrieved from data warehouse 140, temples 310 may determine quantities of cost objects 231 and associated cost data, such as overhead activity costs. The template functions 312 may be algorithms defined by the user or provided by a costing platform 125. Template functions 312 may be formula or algorithms for calculating values in a template 310, such as characteristics and key figures. For example, template functions 312 may represent a costing formula, such as a relationship between the price and quantity of a product. In determining a quantity, the template functions 312 may be stored within elements a template 310 or, for example, in separately data storage device 330.

FIG. 3B provides a functional block diagram the interaction between the template calculation module 324 and the interface module 322, consistent with an embodiment of the present invention. Interface module 322 may receive a request from cost estimation system 105 requesting template calculations by cost evaluation application 130. The request from the cost estimate system 105 may include various data including cost objects 231, template metadata 232, and cost object metadata 234 for selecting and calculating a cost template 310. Interface module 322 may receive the template evaluation request from the cost estimation system 105, repackage the data into one or more data structures and formats required by cost evaluation application 130 and submit a request for template processing to the cost evaluation application 130. For instance, interface module 322 may assemble the received data in separate data structures that are referenced by template calculation module 324.

As described in more detail below, consistent with the present invention, template calculation module 324 may receive a request of cost estimation system 105 for template evaluation from the interface module 322. Based on the provided data, including, for example, cost objects, template metadata 232 and cost object metadata 234 template functions 312, as well as and material cost data and financial cost data from data warehouse 140, template calculation module 324 may evaluate the template, and returns cost data, to interface module 322 for return to cost estimation system 105.

Figure 4A:
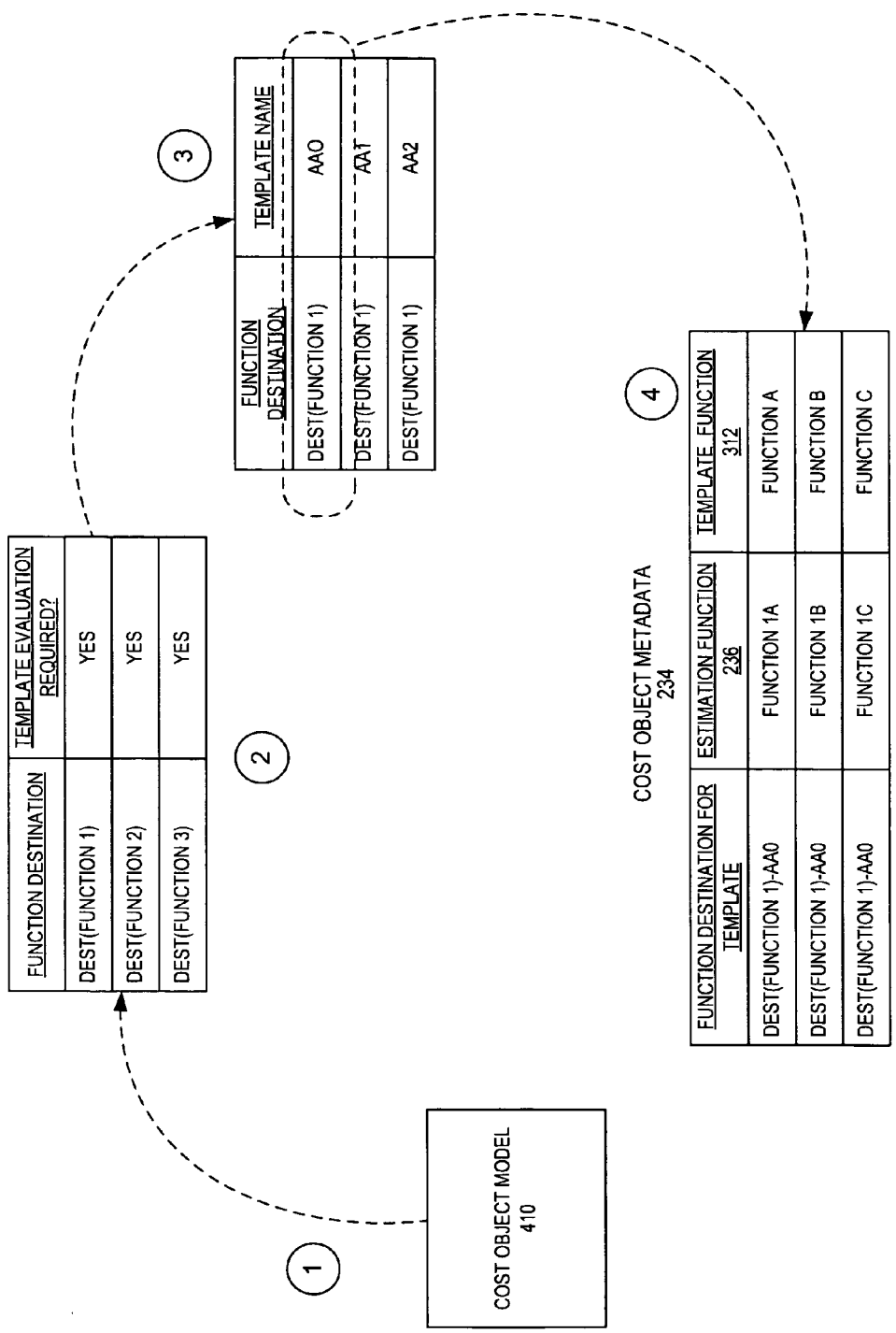
FIGS. 4A and 4B are diagrams of an exemplary process for customizing cost templates, consistent with embodiments of the present invention.
Figure 4B:
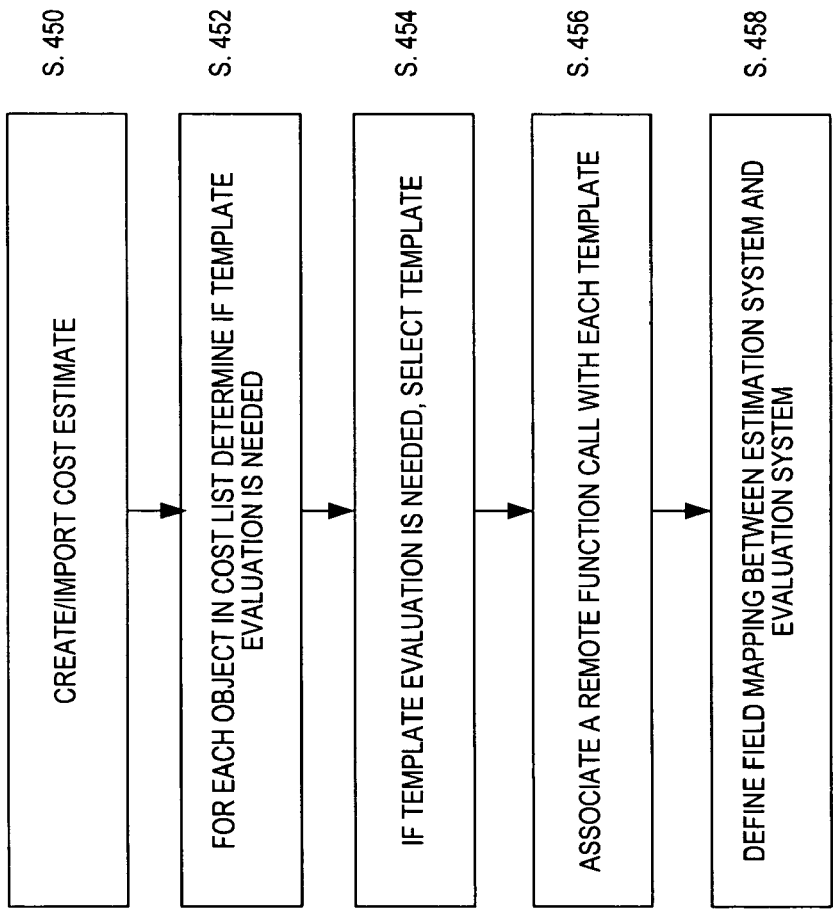

FIGS. 4A and 4B illustrate exemplary processes for modeling new cost objects, consistent with embodiments of the present invention. Initially, the cost objects may not be already available in the costing platform 125. Instead, the new cost objects may become available through the process outlined below.

In accordance with an aspect of the invention, modeling may be achieved using software, such as cost modeling application 107. As shown in FIG. 4A, a user, such as modeler 110, may first create a new cost object 410. The new cost object 410 may be created from scratch in cost modeling application 107, or from a cost object defined in the cost modeling application 107. For instance, by re-using an object from a bill of materials stored in cost modeling application 107, a modeler 110 may create a new cost object 410 (stage "1" in FIG. 4A). For purposes of illustration, assume cost object 410 represents an electric motor for a water pump that is not already modeled or included in costing platform 125. Modeler 110 may assign one or more characteristics "CHAR1, CHAR2, and CHAR3" to cost object 410 (not shown in FIG. 4A), such as "motor size," "manufacturer," "lot size," for example. Next modeler 110 may, by reference to the characteristics or other parameters of the cost object 410, map estimation functions (e.g., estimation functions 236) of the cost object 410 with template functions (e.g., template functions 312) in cost evaluation application 130 (stage "2" in FIG. 4A). To do so, modeler 110 may retrieve from cost evaluation application 130, based on a request through interface module 322, a list of templates 310 available for template calls in costing platform 125. The list may, for example, be retrieved from cost evaluation application 130 using a function call to interface module 322. For each template function destination in the cost object model 410, an indication is provided by modeler 110 as to whether a template calculation is required. If a template is required for cost estimation system 105 to read template functions necessary for mapping, then modeler 110 may select a template for that estimation function destination (stage "3" in FIG. 4A). In one embodiment, each template 310 is selected by name using a user interface or other input device(s). If a template evaluation for the particular estimation function 236 is not required, then a template is not selected by the modeler 110. After each required selection is made, modeler 110 may then map the fields of cost object 410 to the corresponding fields in the selected template(s) (stage "4" in FIG. 4A). In one exemplary embodiment, this mapping is done through the matching of local and remote fieldnames that describe the logical storage location of the cost objects within the respective cost estimation system 105 and cost platform 125. Based on this mapping, estimation functions 236 included in object 410 may be associated with a corresponding template function 312 in the costing platform 125.

To provide a further illustration, FIG. 4B is a flow diagram of an exemplary method for modeling a new cost object in modeling application 107. First, modeler 110 or other user may create a cost estimate or retrieve one from an external source, such as data warehouse 140 (S.450) A cost estimate may comprise a list of one or more cost objects (i.e., a "cost list"). For each cost object in the cost estimate, modeler 110 determines if a template evaluation is needed. (S.452) For instance, direct and material costs may be static values that do not require template evaluation. However, certain cost objects require template evaluation by the functions and data in the cost evaluation application 130. Cost modeling application 107 may provide a user interface (e.g., a graphical user interface) displaying the cost objects of the template and enabling modeler 110 to select which of the cost objects require template evaluation. If so, the modeler 110 selects one of templates 310 based on characteristics required for mapping (S.454). Cost estimation system 105 may retrieve a list of templates 310 available in the costing platform 125 and, based on the list, modeler 110, using cost modeling application 107, may associate the functions associated with the selected cost objects in the template with functions of a corresponding cost object in the cost evaluation application 130 (S.456). Modeler 110 may define field mappings by creating associations between the estimation functions 236 of the cost estimation system 110 with the templates 310 and associated template functions 312 in cost evaluation or costing platform 125 (S.458). Finally, cost modeling application 107 may store the resulting cost object metadata 234 in data storage device 230 for retrieval during template evaluation, as discussed below.

Figure 5A:
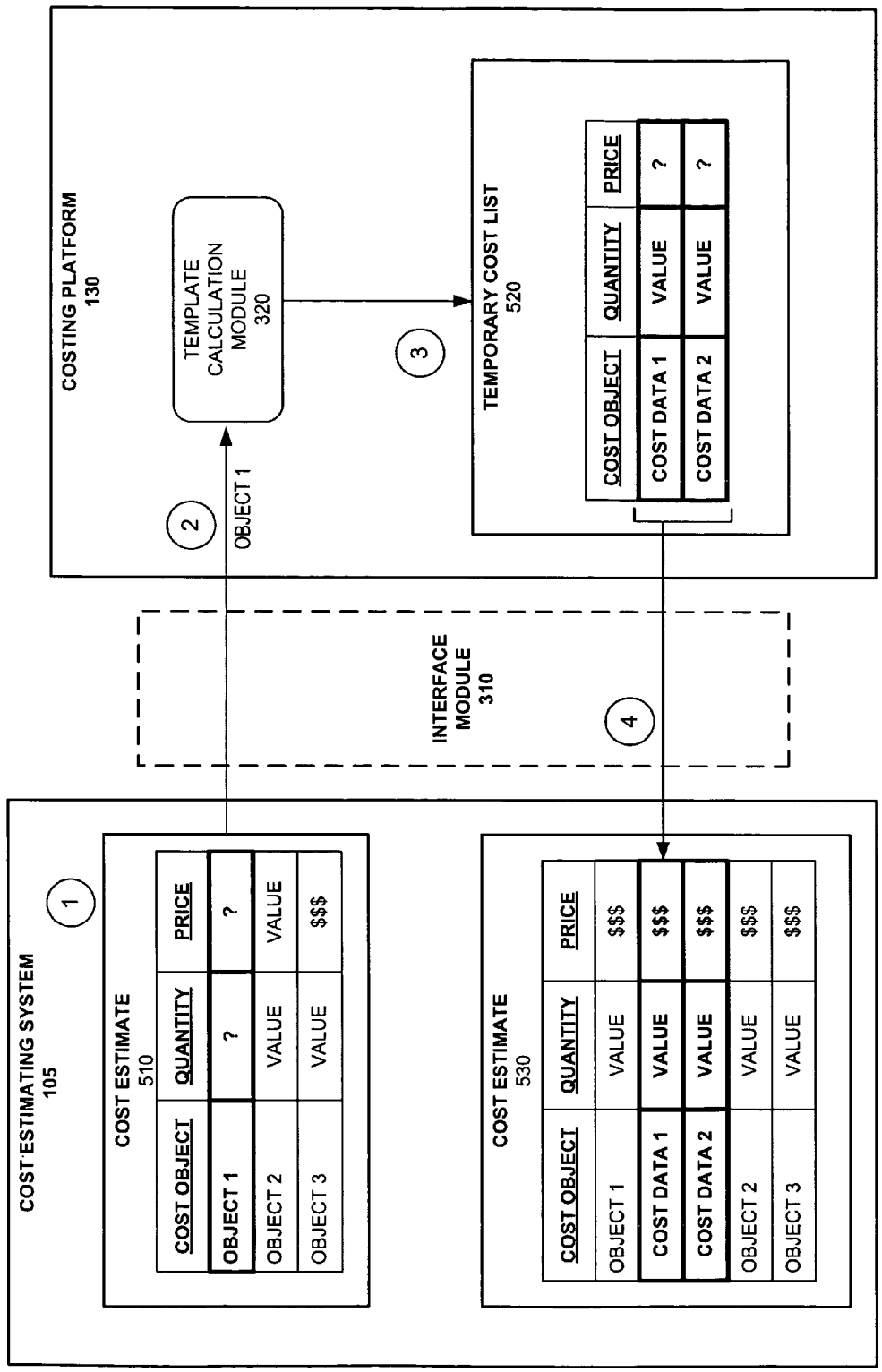
FIGS. 5A and 5B are diagrams of an exemplary process for calculating a cost estimate, consistent with embodiments of the present invention.
Figure 5B:
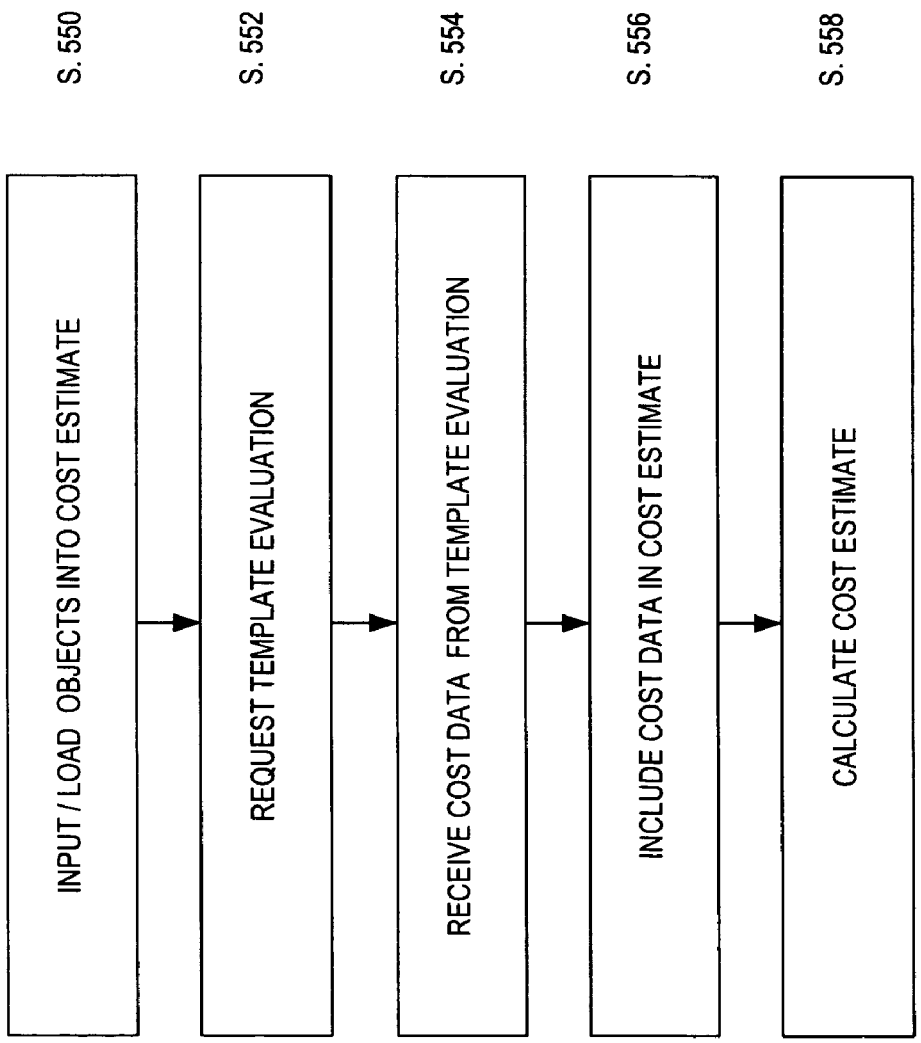

FIGS. 5A and 5B illustrate exemplary methods for processing a cost estimate in cost estimation system 105, consistent with embodiments of the present invention. As shown in FIGS. 5A and 5B, an analyst 115 or other user may create a cost estimate 510 or load a cost estimate from, e.g., data warehouse 140 into cost estimation application 109 (see stage "1" in FIG. 5A; S.550 in FIG. 5B). Cost estimate 510 may represent a product or service and include the cost objects associated with the product or service. For example, cost estimate 510 for producing a water pump may include costs for each component, such as a casing, motor, and impeller. Cost estimate 510 may also include costs for direct labor related to, for example, machining and assembly. The data for the cost object may be pre-installed in the cost modeling application 107 from an external data source (e.g., data warehouse), created by a modeler 110 or loaded from a cost modeling tool (e.g., WINCHEM). Once cost estimate 510 is loaded, analyst 115 may, through a user interface, select cost objects to be included in the cost estimate 510 based on the characteristics of the cost object (S. 552). This may be done, for example, at a cost estimation system 105 by selecting an appropriate menu option or desktop icon.

Once the cost estimate 510 is completed, analyst 115 may request calculation of the cost estimate 510 by cost estimation system 105. Certain cost objects 231, as described by cost object metadata 234, may require cost estimation system 105 to request template evaluation in the cost evaluation application 130 (stage "2" in FIG. 5A; S.554 in FIG. 5B). In response, cost evaluation application 130 may receive cost objects of cost estimate 510 through interface module 322 for the template calculation. Template calculation module 324 may process the cost object 231 of cost estimate 510 and, as described below and may temporarily store the resulting cost data in a temporary cost list 520 (stage "3" in FIG. 5A). These may include, overhead costs data 1 and costs data 2 associated with the Object 1 in cost estimate 510. For example, a particular activity included in the analyst's 105 cost estimate may be associated with overhead costs, such as job planning, waste disposal or quality control. This cost data may then be inserted into the cost estimate 530 based on the result of the template calculation at the cost evaluation application 130 (stage "4"; S.556). The resulting cost estimate 530 may be stored for later retrieval (S.558). Additionally, with the user interface, the cost estimation application 109 may be refreshed to display the results of the evaluation process to the analyst 113.

Although FIG. 5A illustrates a cost estimate 510 having only three cost objects for the purposes of example, one of ordinary skill in the art would recognize that, in practice, a cost estimate may have any number of cost objects and that the configuration of the cost object (e.g., number of columns or rows) may also vary.

Figure 6:
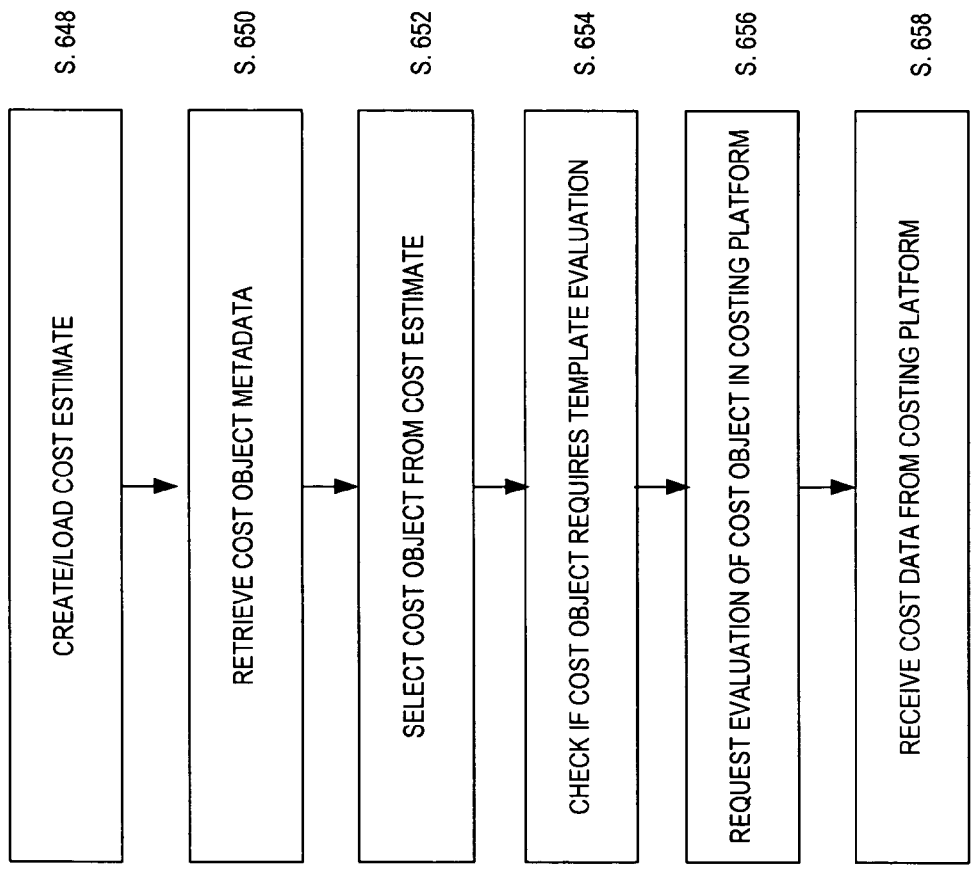
FIG. 6 illustrates a block diagram of an exemplary process, consistent with an embodiment of the present invention.

FIG. 6. Illustrates a flow diagram of an exemplary process for deriving a template 310, consistent with embodiments of the present invention. As before, an analyst 115 or another user may create or load a cost estimate 510 into cost estimation application 109 (S.648). In accordance with one embodiment, the cost estimate 510 may include a list of the cost objects associated with the product or service whose costs are to be estimated. Next, cost object metadata 234 corresponding to the cost objects of the selected cost estimate is retrieved (S.650). The cost object metadata 234 describes associations between estimation functions 236 associated with an cost object of a cost estimate 510 created in a cost estimation system 105 and corresponding template functions 312 associated with templates in the costing platform 125. As noted previously, because the cost evaluation application 130 cannot know the correspondence between functions associated with objects in the cost estimation system 105 and existing tables and functions in the cost evaluation application 130, the cost object metadata 234 may be defined by a modeler 110 and provided to cost evaluation application 130 for evaluation of cost estimate with the cost template 310. Then, for a selected cost object in the cost estimate (S.652), cost estimation system 105 determines, based on the cost object metadata 234 whether each element requires template evaluation (S.654). In particular, cost objects having cost object metadata 234 are evaluated in accordance with the cost object metadata 234. In the case where template evaluation is required for a cost object, cost estimation system 105 calls template calculation module 324 in the cost evaluation application 130 (S.656), as described below with regard to FIG. 7, and in response creates cost data in the cost estimate from the cost object received from as a result of the template evaluation request (S.658).

FIG. 7 illustrates a flow diagram of an exemplary process for template calculation, consistent with embodiments of the present invention. First, cost evaluation application 130 may receive a template evaluation request from cost estimation system 105 (S.750). Along with the evaluation request, cost evaluation application 130 may receive cost object 231, template metadata 232 and cost object metadata 234 (S.752). The template metadata 234 may define the context and relationships of a cost object with regards to the business. For example, template metadata 232 may include data describing the business group or cost center responsible for the activity associated with a cost object, as well as the manner in which overhead is calculated for the group. Next, based on template metadata 234, cost evaluation application 130 may determine the correct template 310 for evaluating the cost objects (S.754). For instance, cost evaluation application 130 may reference a look-up table listing templates 310 in association with various template metadata 236 (e.g., context, business unit, material, plant and/or overhead rate). The template is selected or derived depending on the context of the cost object 230 being evaluated by a template. Cost evaluation application 130 may then create a temporary cost list for receiving the cost data resulting from the evaluation of a template 310 (S.756). The temporary cost list may be, for example, a production or sales order including fields for receiving and holding cost objects generate by the template as a result of the evaluation process.

As further shown in FIG. 7, cost evaluation application 130 may assign material and financial data retrieved from data warehouse 140 to the template (S.758). Based on the above data, including cost objects, template metadata 232, material data, and financial data, cost evaluation application 130 may evaluate the selected template (S.760). By way of the evaluation, cost evaluation application 130 may generate cost data from the selected template 310 based on the cost object provided in the evaluation request. For instance, template evaluation may generate cost data representing an overhead activity necessitated by the performance of the activity provided in the evaluated cost object. Once generated, the new cost object may be stored in the results in the temporary cost list (S.762). Finally, the cost data stored in the temporary cost list are returned to the cost estimation system 105 (S.764).

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and flow charts of this invention are within the skill of an experienced developer and/or programmer. The various programs or program content can be created using any of the techniques known to one skilled in the art or can be designed in connection with existing software. For example, programs or program content can be designed in or by means of Java, C++, HTML, XML, or HTML with included Java applets or in SAP R/3 or ABAP. One or more of such content can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

As disclosed herein, embodiments and features of the invention may be implemented through computer-hardware and/or software. Such embodiments may be implemented in various environments, such as networked and computing-based environments with one or more users. The present invention, however, is not limited to such examples, and embodiments of the invention may be implemented with other platforms and in other environments.

By way of example, embodiments of the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and databases referred to herein symbolize elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implement features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium and used in network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is therefore intended that the specification and examples be considered as exemplary only, with a true scope and spirit of the invention being indicated by the following claims.

What is claimed is:

1. A computer-implemented method for producing a cost estimate, comprising:
    selecting, by a processor of a cost estimation system, at least one cost object included in the cost estimate;
        the cost object requiring evaluation of a first function to be performed by the cost estimation system;
        the selected cost object being described by corresponding cost object metadata;
        the cost object metadata describing a mapping between the first function and a second function in a costing platform; and
        the mapping indicating a matching of local and remote fieldnames that describe a logical storage location of the cost object within the cost estimation system and the costing platform, respectively;
    determining, by the processor of the cost estimation system, based on the cost object metadata, whether the selected cost object requires evaluation using the second function in the costing platform;
    When determining that the cost object requires evaluation using the second function, providing, the cost object to the costing platform as part of an evaluation request;
    receiving, from the costing platform in response to the evaluation request, cost data for the cost object from the costing platform, the cost data being calculated by the costing platform based on the second function determined in accordance with the matching fieldnames; and
    calculating, by the processor in the cost estimation system, the cost estimate using the cost data and the first function and producing the cost estimate via a user interface.

2. The method of claim 1, wherein the first function is a formula for calculating quantities of the cost object.

3. The method of claim 1, wherein the cost object is a user-defined model representing one of components, material, activities and processes involved in producing a product or providing a service.

4. The method of claim 1, wherein the second function is associated with a cost template in the costing platform, said template calculating a quantity for the cost object based the second function.

5. The method of claim 1, wherein the cost estimation system is external to the costing platform.

6. The method of claim 1, wherein the costing platform comprises an enterprise resource planning system.

7. The method of claim 1, wherein the cost object metadata is retrieved from the cost estimation system.

8. The method of claim 1, wherein the evaluation request is a function call to an application program interface of the costing platform.

9. The method of claim 1, wherein the cost data is one of an indirect cost or overhead cost.

10. A computer-implemented method for evaluating cost objects for a cost estimate, comprising:
    selecting, by a processor of a cost estimation system, a cost object included in the cost estimate
        the cost object requiring evaluation of an estimation function stored in the cost estimation system;
        the selected cost object being described by corresponding cost object metadata;
        the cost object metadata describing a mapping between the estimation function stored in the cost estimation system and a template function stored in a costing platform; and
        the mapping indicating a matching of local and remote fieldnames that describe a logical storage location of the selected cost object within the cost estimation system and the costing platform, respectively;
    determining, by the processor of the cost estimation system based on the cost object metadata, whether the selected cost object requires evaluation using the template function of the costing platform;
    when determining that the selected cost object requires evaluation using the template function, sending a request to evaluate the cost object to the costing platform;
        the request including the cost object metadata and template metadata;
        the template metadata indicating a template for evaluating the cost object by a processor of the costing platform; and
        the template including the template function;
    receiving, from the cost estimation system, the request to evaluate the cost object;
    retrieving, by the processor of the costing platform, the template indicated by the template metadata from the storage location and associating the estimation function with the template function based on the matching fieldnames;
    calculating, by the processor of the costing platform, cost data for the cost object based on the template; and
    providing, to the cost estimation system, cost data for the cost object, wherein the cost estimation system calculates the cost estimate based on the cost data and the estimation function using the processor of the cost estimation system and produces the cost estimate via a user interface.

11. The method of claim 10, wherein the cost object is a user-defined model representing one of components, material, activities and processes involved in producing a product or providing a service.

12. The method of claim 10, wherein the cost estimation system is external to the costing platform.

13. The method of claim 12, wherein the costing platform comprises an enterprise resource planning system.

14. The method of claim 10, wherein the cost object metadata is retrieved from the cost estimation system.

15. The method of claim 14, wherein sending the request to evaluate comprises making a function call to an application program interface of the costing platform.

16. The method of claim 10, wherein the cost data is one of an indirect cost or overhead cost.

17. A computer system for evaluating cost objects for a cost estimate, comprising:
    a first processor disposed in a cost estimation system, the first processor configured to:
        select a cost object included in the cost estimate;
            the selected cost object being described by corresponding cost object metadata;
            the cost object metadata describing a mapping between an estimation function stored in the cost estimation system and a template function stored in a costing platform; and
            the mapping indicating a matching of local and remote fieldnames that describe a logical storage location of the cost object within the cost estimation system and the costing platform, respectively;
        determine, based on the cost object metadata, whether a request to evaluate the cost object is required;
        send the request to evaluate the cost object to the costing platform when it is determined that the request to evaluate is required;
            the request including the cost object metadata and template metadata;
            the template metadata indicating a template for evaluating the cost object within the costing platform;
            the template including the template function;
        receive cost data for the selected cost object from the costing platform; and
        calculate the cost estimate using the cost data and the estimation function and produce the cost estimate via a user interface;
    a second processor disposed in the costing platform, the second processor configured to:
        receive, from the cost estimation system, the request to evaluate the cost object;
        retrieve the template indicated by the template metadata from the storage location;
        associate the estimation function with the template function in accordance with the matching fieldnames;
        calculate the cost data based on the template; and
        provide the cost estimation system with the cost data; and
    a computer memory configured to provide, to the cost estimation system, cost data for the cost object, wherein the cost estimation system calculates the cost estimate based on the cost data and produces the cost estimate via a user interface.

* * * * *